United States Patent
Memisoglu et al.

(10) Patent No.: US 12,021,674 B2
(45) Date of Patent: Jun. 25, 2024

(54) REDUCTION OF PEAK TO AVERAGE POWER RATIO EXPLOITING MULTI-NUMEROLOGY STRUCTURE

(71) Applicant: Vestel Elektronik Sanayi ve Ticaret A. S., Manisa (TR)

(72) Inventors: Ebubekir Memisoglu, Istanbul (TR); Ahmet Enes Duranay, Istanbul (TR); Hüseyin Arslan, Istanbul (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 22 days.

(21) Appl. No.: 18/007,078

(22) PCT Filed: Aug. 12, 2021

(86) PCT No.: PCT/EP2021/072469
§ 371 (c)(1),
(2) Date: Jan. 27, 2023

(87) PCT Pub. No.: WO2022/043074
PCT Pub. Date: Mar. 3, 2022

(65) Prior Publication Data
US 2023/0291623 A1   Sep. 14, 2023

(30) Foreign Application Priority Data
Aug. 31, 2020   (EP) ..................................... 20193701

(51) Int. Cl.
   *H04L 27/26*      (2006.01)
(52) U.S. Cl.
   CPC .... *H04L 27/26025* (2021.01); *H04L 27/2614* (2013.01)

(58) Field of Classification Search
   CPC ........... H04L 27/26025; H04L 27/2614; H04L 27/2615; H04L 27/2617; H04L 27/262; H04L 27/2623; H04L 27/2621; H04L 27/2618; H04L 27/2602; H04L 27/2603; H04L 27/2605; H04L 27/2607
   See application file for complete search history.

(56) References Cited

U.S. PATENT DOCUMENTS 10,412,745 B2 *  9/2019  Fodor ................... H04L 27/261
11,018,916 B2 *  5/2021  Ibrahim ............... H04B 17/336
(Continued)

FOREIGN PATENT DOCUMENTS

EP          2448334 A1      5/2012

OTHER PUBLICATIONS

Demir, "Inter-numerology Interference Management with Adaptive Guards: A Cross-layer Approach", IEEE Access, 2020, pp. 1-8.
(Continued)

*Primary Examiner* — Khanh C Tran
(74) *Attorney, Agent, or Firm* — The Webb Law Firm

(57) ABSTRACT

Methods and techniques are described for reducing PAPR in a system with multiple numerologies. The PAPR is reduced by means of minimization of a cost function including PAPR for some predefined parameters. For example, PAPR may be minimized for phase and/or amplitude and/or time/cyclic shift adjustment to adjust OFDM symbol phase and/or amplitude, or for number and/or type of numerologies to be combined for the transmission.

18 Claims, 9 Drawing Sheets

(56) References Cited

U.S. PATENT DOCUMENTS

2019/0379488 A1* 12/2019 Demir .................. H04L 1/1642
2023/0216721 A1*  7/2023 Bengtsson ............. H04L 5/001
                                                    370/329

OTHER PUBLICATIONS

Gokceli et al. "PAPR Reduction with Mixed-Numerology OFDM", Arxiv.Org, Cornell University Library, 2019, pp. 1-6.
Jawhar et al., "A Review of Partial Transmit Sequence for PAPR Reduction in the OFDM Systems", IEEEAccess, 2019, vol. 7, pp. 18021-18041.
Liu et al., "Peak-to-Average Power Ratio Analysis for OFDM-Based Mixed-Numerology Transmissions", IEEE Transactions on Vehicular Technology, 2019, vol. 69:2, pp. 1802-1812.
Liu et al., "PAPR Reduction Using Iterative Clipping/Filtering and ADMN Approaches for OFDM-Based Mixed-Numerology Systems", IEEE Transactions on Wireless Communications, 2020, vol. 19:4, pp. 2586-2600.
Vivo: "Feasibility study on subband constellation rotation for uplink PAPR reductions for CP-OFDM waveform", 3GPP TSG RAN WG1 Meeting #90, Prague, Caech Republic, 2017, pp. 1-5.

* cited by examiner

REDUCTION OF PEAK TO AVERAGE POWER RATIO EXPLOITING MULTI-NUMEROLOGY STRUCTURE

CROSS-REFERENCE TO RELATED APPLICATIONS

This application is the United States national phase of International Application No. PCT/EP2021/072469 filed Aug. 12, 2021, and claims priority to European Patent Application No. 20193701.8 filed Aug. 31, 2020, the disclosures of each of which are hereby incorporated by reference in their entireties.

BACKGROUND

Field

The present disclosure relates generally to communication, and, in some particular embodiments, to techniques for transmission of signals using a multi-numerology.

TECHNICAL CONSIDERATIONS

Wireless communication has been advancing over several decades now. Global communication systems as well as local network systems have been recently using technology based on Orthogonal Frequency Division Multiplexing (OFDM).

One of the major drawbacks of the OFDM is a high peak-to-average power ratio (PAPR), which may lead to signal distortion in the nonlinear region of high power amplifiers. This may result in the degradation of the overall system performance.

In the fifth generation (5G) New Radio (NR) system, the term numerology refers to a combination of some physical layer parameters which define size and location of system resources. For example, a numerology may be given by subcarrier spacing (SCS). Sometimes, number of slots per subframe is also considered as a part of the numerology. Further parameters which may change with numerology are the number of OFDM symbols per slot/subframe, duration of the OFDM symbol, and/or duration of the cyclic prefix (CP). In general, the slot length becomes shorter as the subcarrier spacing gets wider. In the current 5G NR, there are multiple different numerologies such as 15, 30, 60, and 120 kHz SCS.

Multi-numerology systems are systems which support co-existence of multiple different numerologies. For example, in 5G, different numerologies can be transmitted on the same carrier frequency. Bandwidth parts with different numerologies can be multiplexed in the frequency domain. The 5G NR is based on CP-OFDM with different numerologies and diversified Quality of Service (QoS). It is expected to act as a platform enabling wireless connectivity to all kinds of services. The different service classes defined for 5G include enhanced mobile broadband (eMBB), massive machine type communications (mMTC), and ultra-reliable and low latency communications (URLLC). These scenarios have their own specific demands causing 5G to have a wide range of requirements, which dictates the need for a high degree of flexibility in the radio and network designs. One of the steps taken towards achieving the required flexibility in 5G systems is the introduction of the multi-numerology concept under the umbrella of 5G-NR.

Reduction of PAPR for multi-numerology systems is a challenging task, which may improve the performance of the system.

SUMMARY

Methods and techniques are described for reduction of PAPR in an OFDM signal obtained by combination of multiple numerologies.

The disclosed subject matter includes, but is not limited to, the independent claims. Some exemplary implementations are provided by the dependent claims.

In some implementations, a transmitting device is provided which comprises processing circuitry configured to: generate a plurality of OFDM symbols of at least two numerologies; determine an adjustment processing for each of the plurality of OFDM symbols based on minimizing a cost function including peak-to-average power ratio, PAPR, for a combination of the at least two numerologies; apply, to each of the plurality of OFDM symbols, the corresponding determined adjustment processing, and combine the adjusted OFDM symbols of the at least two numerologies, and a transceiver configured to transmit a signal carrying the combined adjusted OFDM symbols of the at least two numerologies.

In some implementations a transmitting device is provided. The transmitting device comprises processing circuitry configured to: determine at least two numerologies out of a predefined set of numerologies based on minimizing a cost function including peak-to-average power ratio, PAPR, for combinations of numerologies out of the predefined set of numerologies; generate a plurality of OFDM symbols of the at least two numerologies; and combine the OFDM symbols of the at least two numerologies, and a transceiver configured to transmit a signal carrying the combined at least two numerologies.

In some implementations a method is provided for transmitting a signal, the method comprising the steps of: generating a plurality of OFDM symbols of at least two numerologies; determining an adjustment processing for each of the plurality of OFDM symbols based on minimizing a cost function including peak-to-average power ratio, PAPR, for a combination of the at least two numerologies; applying, to each of the plurality of OFDM symbols, the corresponding determined adjustment; combining the first numerology and the second numerology; and transmitting a signal carrying the combined first numerology and second numerology.

In some implementations a method for transmitting a signal, the method comprising the steps of: determining at least two numerologies out of a predefined set of numerologies based on minimizing a cost function including peak-to-average power ratio, PAPR, for combinations of numerologies out of the predefined set of numerologies; generating a plurality of OFDM symbols of the at least two numerologies; combining the OFDM symbols of the at least two numerologies; and transmitting a signal carrying the combined at least two numerologies.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF DRAWINGS

An understanding of the nature and advantages of various embodiments may be realized by reference to the following figures.

Like reference numbers and symbols in the various figures indicate like elements, in accordance with certain example implementations.

Description

Figure 2:
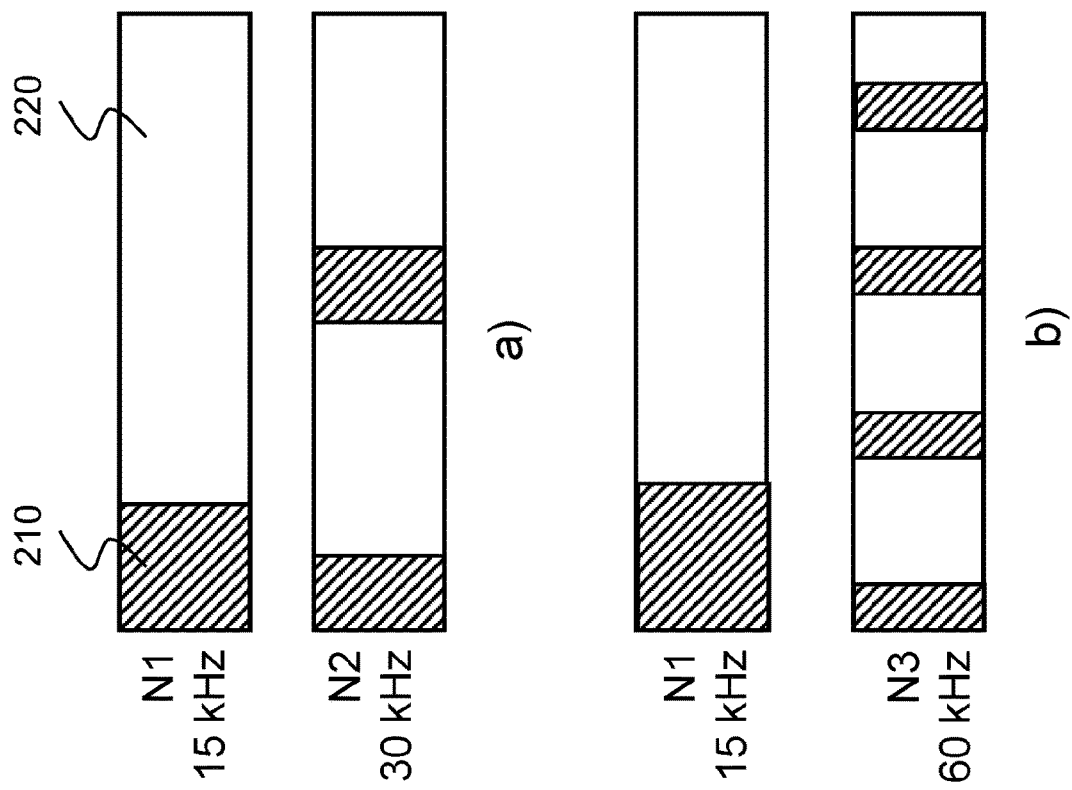
FIG. 2 is a schematic drawing illustrating two different mixed numerologies.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Figure 1:
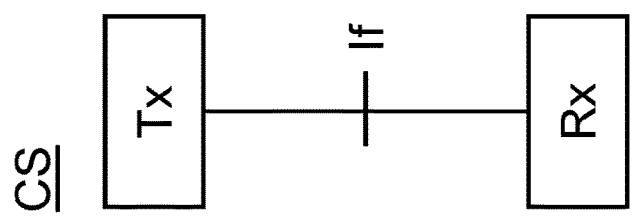
FIG. 1 is a block diagram illustrating a communication system.

FIG. 1 illustrates an exemplary communication system CS in which Tx represents a transmitter and Rx represents a receiver. The transmitter Tx is capable of transmitting a signal to the receiver Rx over an interface If. The interface may be, for instance, a wireless interface. The interface may be specified by means of resources, which can be used for the transmission and reception by the transmitter Tx and the receiver Rx. Such resources may be defined in one or more (or all) of the time domain, frequency domain, code domain, and space domain. It is noted that in general, the "transmitter" and "receiver" may be also both integrated in the same device. In other words, the devices Tx and Rx in FIG. 1 may respectively also include the functionality of the Rx and Tx.

The present disclosure is not limited to any particular transmitter Tx, receiver Rx and/or interface If implementation. However, it may be applied readily to some existing communication systems as well as to the extensions of such systems, or to new communication systems. Exemplary existing communication systems may be, for instance the 5G New Radio (NR) in its current or future releases, and/or the IEEE 802.11 based systems such as the recently studied IEEE 802.11be or the like.

As mentioned above, reduction of PAPR may improve the system performance. Thus, some known iterative-cancellation and filtering (ICF) techniques may clip the signal to keep it under a threshold level to reduce the PAPR value. However, the clipping may cause some distortion and after the clipping operation, filtering of the signal should be applied. Selected mapping is another technique in which the input symbol sequence is multiplied by multiple random phase sequences to generate several alternative symbol sequences. Each of these alternative symbol sequences is transformed by inverse fast Fourier transformation (IFFT), and then, the symbol sequence with the lowest PAPR is chosen for the transmission. A further technique is partial transmit sequence (PTS) applicable in OFDM. The PTS splits input symbols into subblocks and transforms them with IFFT. Each subblock is multiplied by all possible combinations of the phase factors and the corresponding PAPR is calculated. The optimum phases are obtained, which minimize the PAPR.

However, PAPR reduction for mixed-numerology may be more complex than for a single numerology, so that the above-mentioned techniques are difficult to be applied in such scenario. For example, mixed-numerology may have a different structure at the transmitter and at a receiver side and may require a higher computational complexity. Therefore, PAPR techniques that require an additional and complex architecture would be practical to be avoided in order not to further increase computational complexity for the mixed-numerology transmission. Another issue in the PAPR reduction for mixed-numerology may be inter-numerology interference (INI). Some single-numerology techniques may generate INI as a side effect of decreasing the PAPR. Therefore, it may be advantageous if INI were considered, when designing a PAPR reduction technique for the mixed-numerology transmission.

FIG. 2 exemplifies two possible mixed-numerologies a) and b). A system with mixed numerologies is a system of which the time domain signal is a combination (such as sum or weighted sum or another combination) of signals obtained for different numerologies. A first exemplary numerology combination under a) includes numerology N1 and numerology N2. A second exemplary numerology under b) includes numerology N1 and numerology N3. In these examples, numerology N1 has the SCS of 15 kHz, numerology N2 has the SCS of 30 kHz, and numerology N3 has the SCS of 60 kHz. Numerology N1 has a CP 210 and a symbol part 220. The length of the symbol part 220 may be given by means of samples to be subjected to IFFT and/or by means of duration (e.g. in seconds). In FIG. 2, the CP 210 is represented by a dashed portion, while the symbol part is represented by empty portion. The dimensions are only symbolic, e.g. the dimension difference between N1 and N2 in frequency domain is not represented in FIG. 2. As can be seen, in this example, one symbol in N1 corresponds to two symbols in N2 (here, the term symbol includes CP part and symbol part). In mixed-numerology systems, the symbols (possibly including CP) may be aligned in time domain. It is noted that the embodiments of the present disclosure may also work without CP. Accordingly, when referring herein to symbols or OFDM symbols, they may but do not have to include CP. In the cyclic prefix 210, the samples from the symbol part 220 are cyclically repeated (repetition of the last samples of the OFDM symbol). CP facilitates mitigation of inter-symbol interference (ISI).

For example, the numerologies N1 and N2 shown in FIG. 2 may be aligned in time domain. In general, all numerologies within the multiple-numerology combination may be aligned in the time domain. For example, with the scalable numerology design of 5G NR, the OFDM symbol duration (including CP) of one numerology is an integer multiple of the OFDM symbol duration (including CP) of another numerology. Therefore, mixed-numerology symbols are aligned over the least common multiplier symbol duration.

A resource element is a smallest unit of resource, given in time domain by OFDM symbol duration and in frequency domain by subcarrier bandwidth. A single resource element may accommodate a single modulation symbol (such as QPSK, 16QAM, 64QUAM, 256QAM or the like). In general, a resource element of 15 kHz spacing and a resource element of 30 kHz spacing may both correspond to one cycle of a sine wave with the frequency given by the spacing. This automatically leads to different respective symbol durations for the same number of sine periods, as is also seen in FIG. 2. For example increasing the SCS by factor of 2 decreases the resource element duration by a factor of 2. In 5G NR, there are 14 symbols per slot in each numerology, but the number of slots per subframe differs. For example, for the 15 kHz numerology, there is one slot per subframe; for the 30 kHz numerology, there are two slots per subframe; for the 60 kHz numerology, there are four slots per subframe.

For simplicity, the following explanations are provided considering two different numerologies such as N1 and N2. However, in general, the present disclosure is applicable to any mixed-numerology systems that include more than two different missed numerologies. For example, CP-OFDM waveform may be utilized for data transmission.
PAPR Reduction but Adjusting OFDM Symbols FIG. 3A illustrates a transmitting device 350 according to some exemplary embodiments. The transmitting device 350 comprises memory 310, processing circuitry 320, and a wireless transceiver 330, which may be capable of communicating with each other via a bus 301. The transmitting device 350 may further include a user interface 340. However, for some applications, the user interface 340 is not necessary (for instance some devices for machine-to-machine communications or the like).

The memory 310 may store a plurality of firmware or software modules, which implement some embodiments of the present disclosure. The memory may 310 be read from by the processing circuitry 320. Thereby, the processing circuitry may be configured to carry out the firmware/software implementing the embodiments. The processing circuitry 320 may include one or more processors, which in operation generate(s) a plurality of symbols of at least two numerologies (e.g. N1 and N2, or N1 and N3). This corresponds to the transmitting device (apparatus) including a functional symbol generation module (unit) for generating the symbols. The at least two numerologies may mutually differ by SCS and/or by the length of the symbols.

The processing circuitry 320 in operation further determines an adjustment for each of the plurality of symbols based on minimizing a cost function. The cost function includes peak-to-average power ratio, PAPR, for a combination of the at least two numerologies (here exemplarily N1, N2 or N1, N3). This corresponds to the transmitting device (apparatus) including a functional adjustment determination module (unit) for determining the adjustment. The combination of the numerologies may be, by way of a non-limiting example, a sum or a weighted sum, or another combination. For example, the adjustment may be a phase adjustment and/or an amplitude adjustment.

Then the processing circuitry 320 in operation applies, to each of the plurality of symbols, the corresponding determined adjustment processing and combines the at least two numerologies (e.g. a first numerology such as N1 and a second numerology such as N2). This corresponds to the transmitting device (apparatus) including a functional adjustment application module (unit) for adjusting (modifying) the symbols. The symbols mentioned herein may be orthogonal frequency division multiplexing, OFDM, symbols. However, it is noted that the present disclosure is also applicable for some non-orthogonal or quasi-orthogonal multiplexing schemes. In general, it is applicable for any (OFDM) symbols obtained by an inverse transformation of modulation symbols mapped along the subcarriers in the frequency domain. It is noted that the present disclosure is not limited to any particular multiple access technology. In other words, (OFDM) symbols, which belong (is formed over) at least two numerologies can be transmitted to the same receiver or different receivers. For example, a base station (in general any communication device) may generate and transmit an OFDM symbol carrying data for the same UE or an OFDM symbol in which data is multiplexed for two or more different UEs (in general any two or more other communication devices).

In some embodiments, the processing circuitry performing the functions described herein may be integrated within an integrated circuit on a single chip. The output of the processing circuitry is the combined signal in time domain. It may be a discrete signal, which the processing circuitry may provide to a transceiver 330 for transmission. The processing circuitry may also implement a control function to control the transceiver 330 to transmit the signal. The transceiver 330 is configured (e.g. by the processing circuitry) to transmit a signal by means of symbols carrying the combined at least two numerologies (e.g. first numerology N1 and second numerology N2). For example, the processing circuitry 320 may configure (control) the transceiver 330, over the bus 301, to transmit the signal. The transceiver may be, for example a wireless transceiver.

Figure 3B:
FIG. 3B is a block diagram illustrating modules of memory.
Figure 3A:
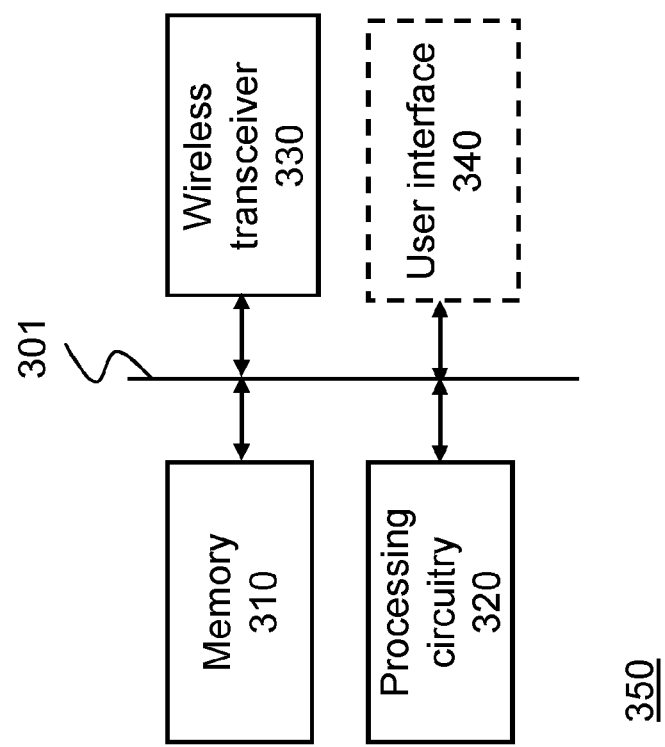
FIG. 3A is a block diagram illustrating a transmitting device.

FIG. 3B shows a schematic functional block diagram of the memory 310 and the functional code parts stored therein. The functional code parts, when executed on the processor(s) 320, perform the respective functions as follows. Application code 360 implements a numerology generator for generating (OFDM) symbols of multiple numerologies. Application code 370 implements an estimation of transmission parameters (such as phase adjustment, amplitude adjustment, time shift, cyclic shift, or the like) so as to reduce the PAPR.

Here, phase adjustment is an adjustment of the phase of the OFDM symbol, e.g. an offset of the phase by a certain adjustment value. Amplitude adjustment is an adjustment of the amplitude by an amplitude adjustment value, which may be a multiplier (factor) or an offset, or both. Time shift is an adjustment, e.g. a shift of the OFDM symbol samples in the time domain by a pre-set (e.g. by the optimization) number of samples. Cyclic shift is a shift that replaces the first sample positions, which are missing after the shift of the samples with the last samples. In other words, the symbol samples are shifted cyclically. By selecting the appropriate shift, the cost function may also be reduced. For example, in a CP-OFDM system such as the one shown in FIGS. 2a) and 2b), the time shifting or the cyclical shifting may be performed before adding the CPs to the symbols.

Application code 380 implements application of the transmission parameters such as application of the adjustment processing to the (OFDM) symbols. Application code 390 combines the symbols of the multiple numerologies (two or more) and outputs the combined signal x for transmission to the wireless transceiver 330. The wireless transceiver 330 may include a power amplifier PA module and an antenna module. The PA module may include one or more power amplifiers for amplifying signal to be transmitted from the respective one or more antennas of the antenna module. The wireless transceiver may correspond to any known wireless transceiver. It may include further components. Moreover, the wireless transceiver 330 may also implement a wireless receiver portion for receiving signals.

As mentioned above, the program code may cause the processing circuitry (e.g. including one or more processors) to operate as a special purpose computer programmed to perform the techniques disclosed herein. The memory 310 is shown in FIG. 3A to be separated from the processing circuitry. However, this is only an example. In general, the memory 310 may be implemented within the processing circuitry, and e.g., within the one or more processors. The term "memory" refers to any type of long term, short term, volatile, nonvolatile, or other memory and is not to be limited to any particular type of memory or number of memories, or type of media upon which memory is stored.

As mentioned above, the adjustment processing may be a phase adjustment processing and/or an amplitude adjustment processing. Accordingly, the processing circuitry, in operation, may apply, to each of the plurality of (OFDM) symbols, the corresponding determined adjustment processing. For example, the phase adjustment processing may be a phase factor to be multiplied with the (OFDM) symbol. The effect of the multiplication may be a slight rotation of the symbol corresponding to a shifting of the phase. When referring to adjustment of the symbol, what is meant is the adjustment of the symbol samples (may also include the CP). Alternatively or in addition to the phase adjustment (modification), the processing circuitry in operation may further adjust the symbol amplitude value, e.g. by multiplying the amplitude of said (OFDM) symbol by the amplitude adjustment processing. In general, the adjustment processing may be performed by multiplication of the symbol (its samples) with an adjustment value or by adding an offset as the adjustment value, or by other operation. However, the adjustment processing may be also performed by modifying the cyclic shift, by time-shifting the symbol (its samples), by filtering or windowing. The parameters of such adjustment processing may be obtained by the minimization of the cost function. The parameters may be the above mentioned adjustment values, or determination of filter coefficients or the window characteristics. With the filtering and windowing approaches, inter-symbol interference and inter-numerology interference mitigation may be facilitated.

Figure 4:
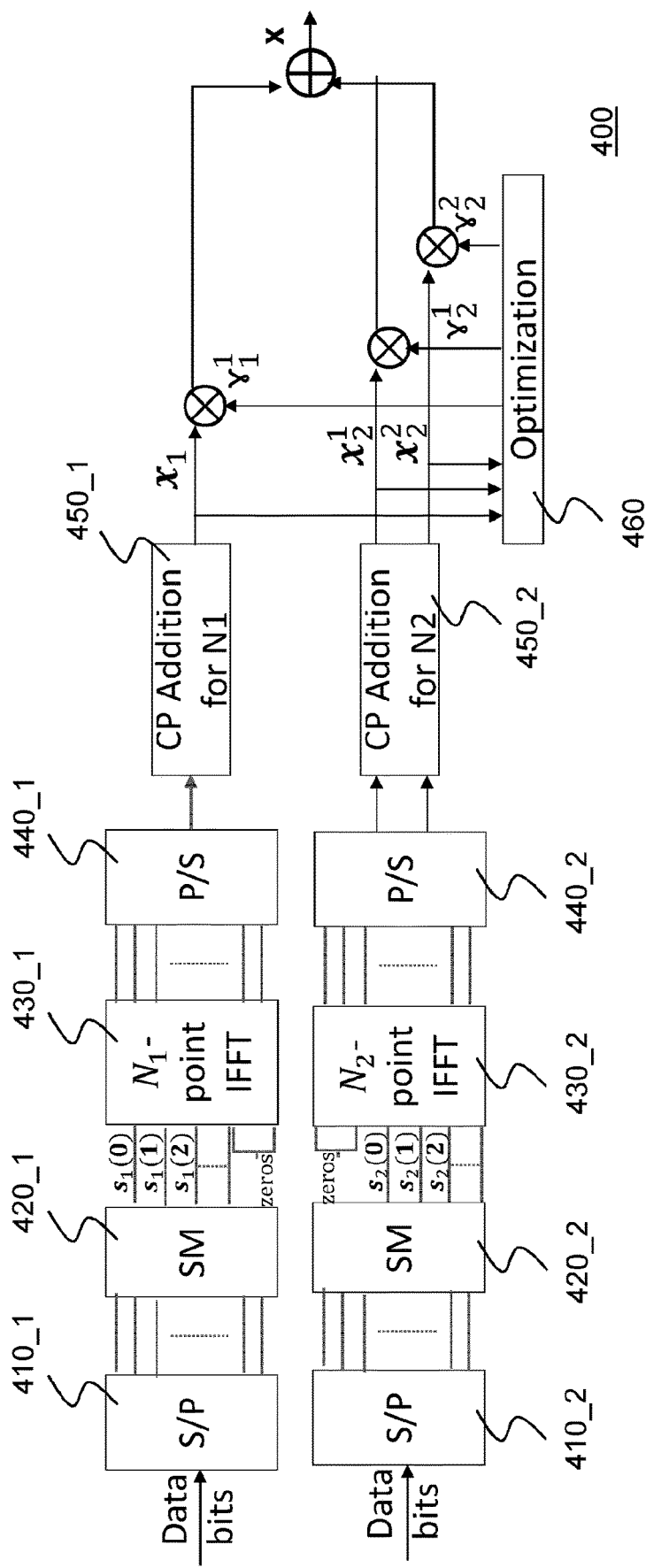
FIG. 4 is a block diagram illustrating functional modules and processing performed by a transmission device.

In FIG. 4, a block diagram of a transmitter device 400 according to an exemplary implementation is shown. In some exemplary implementations, digital processes of a 5G NR transmitter system block diagram are modified to reduce the PAPR value of the time domain signal, x, output from the transmitter device. The transmitter apparatus is inputted data bits, as shown on the left hand side of FIG. 4. The data bits of the upper branch may differ from the data bits of the lower branch. The upper branch is a pipeline for processing the data bits mapped onto resources of numerology N1, whereas the lower branch is a pipeline for processing the data bits mapped onto resources of numerology N2. The numerologies N1 and N2 are mixed as illustrated for instance in FIG. 2, upper part a) to form the output signal x.

The data bits in the upper and lower branches are respectively parallelized in Serial-to-Parallel (S/P) conversion modules 410_1 and 410_2. Then, the bits are mapped onto modulation symbols in the respective Symbol Mappers (SMs) 420_1 and 420_2 of the respective upper and lower branches. The modulation symbols $s_1(0), s_1(1), \ldots$ denote frequency domain signal of the first numerology. In the upper branch, $N_1$ modulation symbols are then transformed by an inverse fast Fourier transformation (IFFT) 430_1. In the lower branch, $N_2$ modulation symbols are transformed by an inverse fast Fourier transformation (IFFT) 430_2. The size of the transformation may differ for different numerologies N1 and N2. In the example of FIG. 2, (e.g., upper part a) or lower part b)) a second numerology has a subcarrier spacing an even integer multiple (scaling factor) of the subcarrier spacing of the second numerology. The scaling factor in a) is 2, and in b) is 4. The scaling factor may be correspondingly used to also govern the size of the IFFT in the inversely proportional manner. As illustrated in FIG. 4, the second half (or, in general, a second part) of the IFFT inputs for the first numerology and the first half (or, in general, a first part) of the IFFT inputs for the second numerology are zero-padded to separate two numerologies in frequency domain with the assumption of equal bandwidth sharing. However, bandwidth of the numerologies can be different. It is noted that although FIG. 4 shows that IFFT is applied, in general, another (e.g. orthogonal or orthonormal) inverse transformation may be applied. For instance inverse discrete Fourier transformation (DFT), discrete cosine or sine transformation or an integer version of such transformation or the like. Application of an inverse transformation to the vectors (with size $N_1$ for numerology N1 or $N_2$ for numerology N2) here corresponds to the OFDM operation, mapping of the modulation symbols onto subcarriers and generating an OFDM symbol for the numerology N1 and two OFDM symbols for the numerology N2. The output of the $N_1$-point IFFT 430_1 is a discrete $N_1$-point signal (which can be seen as a vector of dimension $N_1$) in time domain. Similarly, the output of the $N_2$-point IFFT 430_2 is a discrete $N_2$-point signal (which can be seen as a vector of dimension $N_2$) in time domain—in fact two such $N_2$-point signals. In Parallel-to-Serial (P/S) conversion modules 440_1 and 440_2, the respective upper branch and lower branch OFDM symbols are serialized. As illustrated in FIG. 4, there are two OFDM symbols of numerology N2 (lower branch) for one OFDM symbol of numerology N1 (upper branch). Each OFDM symbol is added a cyclic prefix CP. In the upper branch, corresponding to numerology N1, a CP addition module 450_1 adds a CP of a first length to the OFDM symbol, obtaining thereby the signal $x_1$. In the lower branch, corresponding to numerology N2, a CP addition module 450_2 adds a CP of a second length to each of the two OFDM symbols, obtaining thereby the signal $x_2^1$ and signal $x_2^2$. In some examples including the one of FIG. 4, CP for N1 is longer than CP for N2, corresponding to the SCS in N1 being smaller than SCS in N2 (cf. FIG. 2, upper part a)). However, the present disclosure is not limited to such scenarios. In general, the PAPR reduction as described in the following is applicable to cases for which these conditions are different. The length of the CP in samples may be governed by a pre-set CP ratio which may be belong to the numerology parameters. The above mentioned scaling factor (2 in a) or 4 in b) of FIG. 2) determines how may OFDM symbols with the second numerology are there corresponding to one OFDM symbol with the first numerology. Thus, in this example, the number of samples for each of the numerologies is the same, and they can be added to form a composite signal at the transmitter. However, it is noted that this transmitter side arrangement is not to limit the possibility of employing the present disclosure. Rather, the present disclosure concerning PAPR reduction is equally applicable to other arrangements, for example to arrangements in which the employed IFFT lengths are the same and the number of samples is scaled, or to otherwise modifications of the arrangement.

Figure 5:
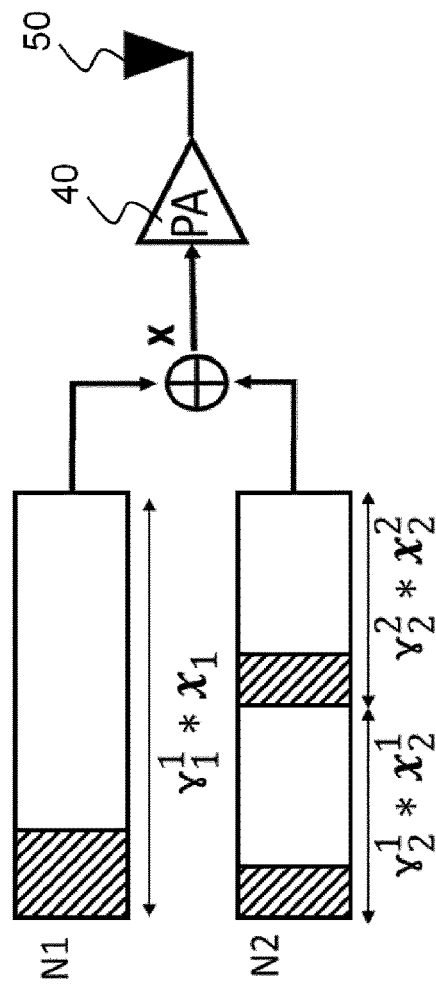
FIG. 5 is a schematic drawing illustrating PAPR reduction for multiple numerologies.

FIG. 5 is a schematic drawing illustrating the combining of the two numerologies N1 and N2. In some examples, CP for N1 is longer than CP for N2, corresponding to the SCS in N1 being smaller than SCS in N2 (cf. FIG. 2, upper part a)). However, the present disclosure is not limited to such scenarios. In general, the PAPR reduction as described in the following is applicable to cases for which these conditions are different.

As shown in FIGS. 4 and 5, the OFDM symbols $x_1$, $x_2^1$ and $x_2^2$ (for each numerology) are multiplied by phase factors $\gamma_1^1$, $\gamma_2^1$ and $\gamma_2^2$ to obtain reduced (possibly, in some embodiments the minimum) PAPR value. As mentioned above and as also shown in FIG. 4, the time domain OFDM symbols (possibly with CP) for the respective numerologies N1 and N2 are expressed by $x_1$ and $x_2$, where $x_2$ is generated by concatenating symbols adjacently as $x_2=[x_2^1 \ x_2^2]$. Herein, "•" denotes concatenation. The concatenation may be imagined as concatenation of two vectors $x_2^1$ and $x_2^2$ to obtain vector $x_2$ with a length of the sum of the lengths of the two vectors $x_2^1$ and $x_2^2$. The symbols $x_1$, $x_2^1$ and $x_2^2$ are multiplied by the phase factors $\gamma_1^1$, $\gamma_2^1$ and $\gamma_2^2$. The multiplication (corresponding to the adjustment) may be performed before or after the concatenation. The adjustment processing (adjustment phase factor) for symbols of different numerologies (e.g. $x_1$ and $x_2$) may be different. However, for some input data, they may also be same. Moreover, the adjustment processing for symbols of the same numerology (e.g. $x_2^1$ and $x_2^2$) may be different. However, for some input data, these adjustment factors may also be the same. It is possible and less complex, to constraint the optimization (cost minimization) by an assumption that $\gamma_2^1=\gamma_2^2$.

The inputs of the optimization module 450 are OFDM symbols (+ the respective CPs, if applied) $x_1$, $x_2^1$ and $x_2^2$. The output of the optimization module 450 (the corresponding optimization process) are optimum $\gamma_1^1$, $\gamma_2^1$ and $\gamma_2^2$ phase and/or amplitude factors to obtain time domain signals of $x_1*\gamma_1^1$, $x_2*\gamma_2^1$, $x_2*\gamma_2^2$. The operator "*" denotes multiplication. Afterwards, these signals are summed with providing reduced PAPR value of signal x. When referring to optimum or minimum, what is meant is an optimum or a minimum achieved by optimizing a certain cost function by a certain optimization approach. The cost function may include PAPR as a cost or cost contribution. However, the present disclosure is not limited thereto. For example, the cost function may be a combination of a plurality of such cost contribution values. For example, the cost function may be a function of not only the PAPR but for instance also the intern-numerology interference or the like. In some exemplary implementations, the cost function is a weighted sum of values (cost contributions) such as PAPR or INI, which on their own may be functions of further parameters for which the optimization may be performed. In general, the cost function C is given by:

$$C=w1*F1(P1, P2, \ldots)+w2*F2(P1, P2, \ldots)+ \ldots$$

Wherein F1 may correspond to PAPR and F2 may correspond to INI, etc. Both F1 and F2 may depend on several parameters such as P1 and P2 (or further parameters). P1 may correspond to the selection of phase adjustment processing $\gamma_1^1$, $\gamma_2^1$ and $\gamma_2^2$ (e.g. phase shifts or phase factors), P2 may correspond to amplitude offset and/or scaling (multiplication), P3 may correspond to the number of combined numerologies, P4 may correspond to the selection of particular numerologies (e.g. by means of the SCS and/or symbol length and/or number of symbols per time unit, or the like), P5 may correspond to a cyclic shift or to time shift or the like. The present disclosure is not limited to any particular number of functions F1, F2, . . . nor to any particular number of parameters P1, P2, . . . . As shown above, the cost function may be specified directly by: $C=PAPR(\gamma_1^1, \gamma_2^1, \gamma_2^2)$.

Returning back to FIGS. 4 and 5, after summing the different numerologies (respective samples of symbols pertaining to different numerologies) as $x_1+x_2$, the resulting summed signal x goes through a power amplifier (PA) 40 and is transmitted by an antenna 50 as shown in FIG. 5. The PA 40 and the antenna 50 may be part of the wireless transceiver 330. To increase the power efficiency of the PA 40, the PAPR value of x should be low.

The PAPR can be calculated by:

$$PAPR = \frac{\max_{0 \leq n \leq N-1} |x_n|^2}{E[|x_n|^2]}$$

where $x_n$ is an amplitude of sample n, n is the sample index, and N is the number of samples. In other words, the combined signal x has a length N of the IFFT of the first numerology (plus the CP length if applied) which corresponds here to twice the length of the IFFT of the second numerology (plus CP length if applied). Operator E[.] denotes the expected value (expectation) of signal power given by $|x_n|^2$. The optimization may be performed by performing the transmission processing for different values of $\gamma_1^1$, $\gamma_2^1$, $\gamma_2^2$ and by finding those values providing smallest PAPR. However, if the transmission operations considered include only linear operations such as linear transformation and/or weighting by $\gamma_1^1$, $\gamma_2^1$, $\gamma_2^2$ so the performing of the transmission processing can be done by calculation for the particular input data bits.

Other than the above-mentioned PTS approach, the embodiments described with reference to FIGS. 3A to 5 do not require additional IFFT operations in comparison with mixed numerology technology not implementing the PAPR reduction. Effects and advantages include provision of an efficient PAPR reduction with limited complexity.

Figure 6:
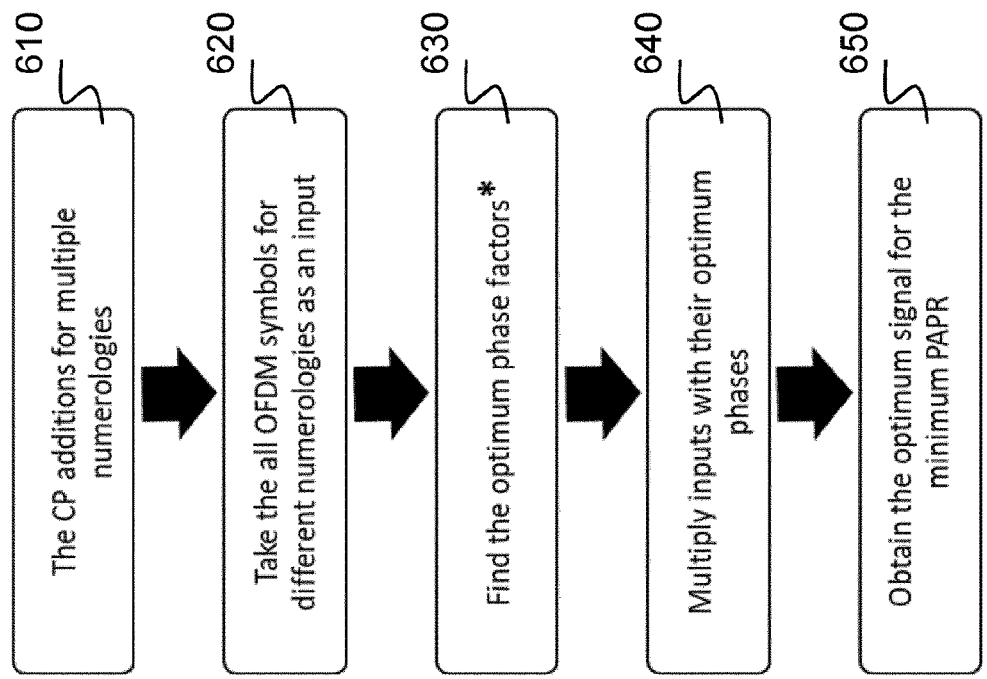
FIG. 6 is a flow chart showing steps of an exemplary method for reducing PAPR for multiple numerologies by provision of a phase adjustment.

FIG. 6 is a flow chart of the corresponding method. The method comprises generating a plurality of OFDM symbols (such as $x_1$, $x_2^1$ and $x_2^2$) of at least two numerologies (such as N1, N2). The generating of the OFDM symbols may include adding 610 of the CP to the OFDM symbols, forming thereby extended OFDM symbols. As mentioned above, the CP length may differ for different numerologies. The number of numerologies may be two, three, or more. The numerologies differ from each other by SCS and possibly also by the length of the OFDM symbols. The length of the OFDM symbols may refers to the number of samples and/or to the time duration. In step 620 of the method, the plurality of the OFDM symbols are taken as an input to the PAPR reduction processing. For example, the plurality of OFDM symbols may correspond to one OFDM symbol of the numerology (such as N1) with the longest OFDM symbol length among the numerologies to be combined and, further, to a plurality of OFDM symbols of each numerology (such as N2). For example, the OFDM symbols of N1 and N2 are aligned in the temporal domain. For example, the number of samples of the longest OFDM symbol equals to the number of samples of the plurality of OFDM symbols of another numerology, for each other numerology.

In step 630, an adjustment processing is determined for each of the plurality of OFDM symbols based on minimizing a cost function including peak-to-average power ratio, PAPR, for a combination of the at least two numerologies. The adjustment processing may be multiplication by a particular phase factor. For example, a first adjustment processing is multiplication with a first phase factor and a second adjustment processing is a multiplication with a second phase factor configurable separately and thus, possibly different) from the first phase factor. This is also applicable to amplitude adjustment.

In step 640, to each of the plurality of OFDM symbols, the corresponding determined adjustment processing is applied. For example, the symbol samples are multiplied with the determined phase factors (this may correspond to a phase offset added to the phase of the symbol samples).

In step 650, the at least two numerologies are combined. The combination may include sample-wise addition of the OFDM symbols of the two different numerologies, or a weighted sum thereof, or the like.

In this exemplary system, the time domain signals of different numerologies after the CP additions are taken 620 as an input for the optimization process. This step is illustrational and may be omitted (or implemented merely by reading the time domain signals from a temporary memory or the like). In the time domain signals the structure can be as shown in FIG. 5. The relation between SCS ($\Delta f_i$) and symbol duration ($T_i$) for $i^{th}$ numerology can be written as below:

$$T_i = \frac{1}{\Delta f_i}$$

One symbol of the numerology with the longest symbol duration aligns with multiple symbols of other numerologies. In order to reduce PAPR, each symbol in the mixed-numerology system is multiplied by an optimum phase factor $\gamma_i^j$ that j represents a symbol index of $i^{th}$ numerology. The term "optimum" here refers to the result of the cost minimizing and does not have to be a global optimum. Rather, as shown below, the optimization may be stopped if the result is acceptable. Since each symbol of multiple-numerologies is multiplied by a phase factor, this multiplication effect can be removed during the channel equalization at the receiver. Therefore, no side information is required for the phase factors. Such PAPR reduction may thus be applied in 5G NR mixed-numerology systems without any modification at the receiver side. A similar approach may be adopted for WiFi such as IEEE 802.11be or other standards. Moreover, the PAPR reduction may be applied to any device of a communication system. For example, the transmission may be an uplink transmission by a user equipment (UE), sidelink by a UE (e.g. in device to device communication), and/or downlink transmission by a network node such as base station (e.g. gNB) in 5G NR or another wireless cellular standard. The transmission may be a transmission by a STA and/or a transmission in a WiFi context. In general, any other standards or proprietary implementations employing mixed numerologies may apply the PAPR reduction.

Although the phase factor multiplication has been exemplified to minimize the PAPR value, different approaches such as amplitude multiplication, time shifting, filtering so on, can be utilized (e.g. in addition or separately from the phase adjustment) to optimize the signal for the minimum PAPR value. Correspondingly, the processing circuitry may be configured to apply, to each of the plurality of OFDM symbols, the time shifting value and/or filtering with the filtering parameters and/or windowing parameters determined by minimizing the cost function. The filtering parameters may include at least one of a filter order, a filter type, and the filter coefficients.

As mentioned above, the PAPR may be reduced by selecting appropriate symbol adjustment processing(s). In addition, the PAPR may be further reduced in that the processing circuitry (320) in operation selects a number of numerologies to be combined and/or the at least two numerologies among a predefined set of numerologies. The selection may be based on the PAPR of the symbols generated by the combining of the (possibly selected) number of the (possibly selected) numerologies. In other words, in addition to adjusting the symbol samples, one of the following may be selected to further reduce PAPR:

a) number (amount) of numerologies. The number may be two or more. The selection may also lead to a single numerology.

b) based on the number of numerologies determined in step a), the numerologies (one or more) may be selected out of a predefined set of numerologies. This corresponds to determining the parameters for the selected number of numerologies. It is noted that in some embodiments, one of the numerologies may be predefined. For example, it may be prescribed by a standard or implementation that one of the numerologies is always N1. Then in some embodiments, only the additional numerology or numerologies are selected. This may be referred to as numerology type or parameter selection. Such type or parameters may be defined the SCS and/or CP length and/or other values.

c) based on a preconfigured number of numerologies, the numerologies (one or more) may be selected out of a predefined set of numerologies. The preconfigured number may be defined by a standard or may be configured by higher layer control protocol (signaling, such as radio resource control, RRC, protocol).

In some exemplary implementations, the selection of the number of numerologies to be combined and/or the at least two numerologies to be combined is performed by minimizing said cost function depending on the number of numerologies to be combined and/or the at least two numerologies (in addition to the adjustment processing).

The set of predefined numerologies, out of which the selection is performed, may be defined in the standard or configurable as a subset of a bigger set of all possible numerologies. It is noted that the determination of the number and the type of the numerologies may be jointly selected. The selection of the numerology may then be signaled form the transmitter (Tx) to the receiver (Rx) in a usual way.

According to some exemplary implementations, the processing circuitry is configured to perform said determining of the adjustment processing iteratively, by determining the cost function for adjustment processings out of a predefined set of adjustment processings, and by selecting, from the predefined set of adjustment processings, the adjustment processing for which the lowest cost function was achieved. The set of adjustment processings may be, for instance a set of phases such as {0, pi/2, pi, 3*pi/2} may be provided (in standard or preconfigured). Then the phases are used to calculate cost function values C1 to C4 for these phases, respectively. The phase leading to a lowest cost value is selected.

It is noted that some iterative implementations may include, in addition to iterations over the phase adjustment, iterations over the amplitude adjustment processings, iterations over a number of numerologies (such as {1, 2, . . . , N}) and/or iterations over the types of numerologies (such as SCSs out of {15 kHz, 30 kHz, 60 kHz, 120 kHz}). The iterations may be performed, for example, over all combinations of the number of numerologies and type of numerologies and phase adjustment processing. Other examples of combinations are possible and as is clear to those skilled in the art.

As mentioned above, alternatively or in addition, the iterations may be performed over other types of adjustment processing. For example, the iterations may go over a set of pre-set cyclic shifts or time shifts, over different filters or windows, and/or over any other parameters that may have an impact on the PAPR.

According to some exemplary implementations, the iterations are stopped when the cost is lower than a stopping threshold. The stopping threshold may be predefined in a standard, or preconfigured based on some parameters such as capabilities of the transmitter device, service requirements, battery/power supply status, or the like. For example, a transmitter device with lower capabilities, less delay-critical services, low battery, or generally power-saving settings may have a higher threshold, leading to terminating the iterations for a possibly higher PAPR, i.e. PAPR possibly farther from the achievable minimum. It is noted that a different termination criteria may be used during the optimization, such as a limited number of combinations, which are tested (configurations for which PAPR is determined and stored). Such optimization may be accompanied by some ordering of the combinations to be tested starting from the most promising ones. Additional or alternative termination criteria may be provided.

It is noted that the iterations do not need to be performed over all possible settings. The settings may be also picked randomly and the number of iterations pre-configured. Mixed solutions are possible which, for example go over all possible numerologies, but try out only a subset of all possible combinations of phase adjustment processing and amplitude adjustment processing or the like.

In summary, the transmitting device, in some embodiments including the above described example, has the processing circuitry, which is configured to iteratively perform the minimizing of the cost function. Performing the minimizing does not mean that an actual minimum must be found. Rather, some reduction of the PAPR may be achieved by selecting the configurations with lower PAPR than other configurations. For example, each iteration includes obtaining a number of numerologies and the subcarrier spacing of each of the obtained number of numerologies; and determining PAPR for the signal generated with a combination of these numerologies. Then the processing circuitry is configured to select the two or more numerologies, which lead to a lowest PAPR among the iterations. It is noted that either of or both may be selected: the number of numerologies and the type (SCS, symbol length etc) of the numerologies. Some implementations may store all the PAPR values and select the best one after iterations, or may always only store the PAPR value and the corresponding configuration, which is lower than the previously stored PAPR value.

As will be shown below with reference to FIGS. 8 and 9, the adjustment processing may be combined with the PTS approach.

PAPR Reduction by Adjusting Configuration of Numerologies

In some exemplary implementations, the number and types of multiple-numerologies are predetermined. For instance, the number and type of the numerologies are configured based on the system requirements. Such system requirements may be, for instance, the capabilities of the communicating device (transmitting device), service requirements, load of the system or the like. In a hierarchically organized system with a base station (or access point; or generally a network node) on one side and a user equipment (or station, STA; or generally a terminal) on the other side, the numerology may be configured by the network node and the configuration may be provided to the terminal. However, the configuration may be also performed cooperatively with the terminal requesting certain configuration. Similarly the device to device communication (direct communication) between two devices may have an initial phase in which the numerology to be used is negotiated between the communicating devices. For the PAPR reduction as described above, such configured numerology is an assumption. It means that the proposed PAPR reduction is applied based on the (pre-)selected numerologies.

However, the present disclosure is not limited thereto. In some embodiments, is possible that the number and types of the multiple-numerologies is chosen to decrease the PAPR. In other words, according to some embodiments, numerology scheduling for PAPR reduction in a system using mixed-numerologies is provided. Such numerology scheduling based on resulting PAPR may be used alternatively or in addition to the adjustment processing applied to the OFDM symbols as described above with reference to FIGS. 3A to 6.

Figure 7:
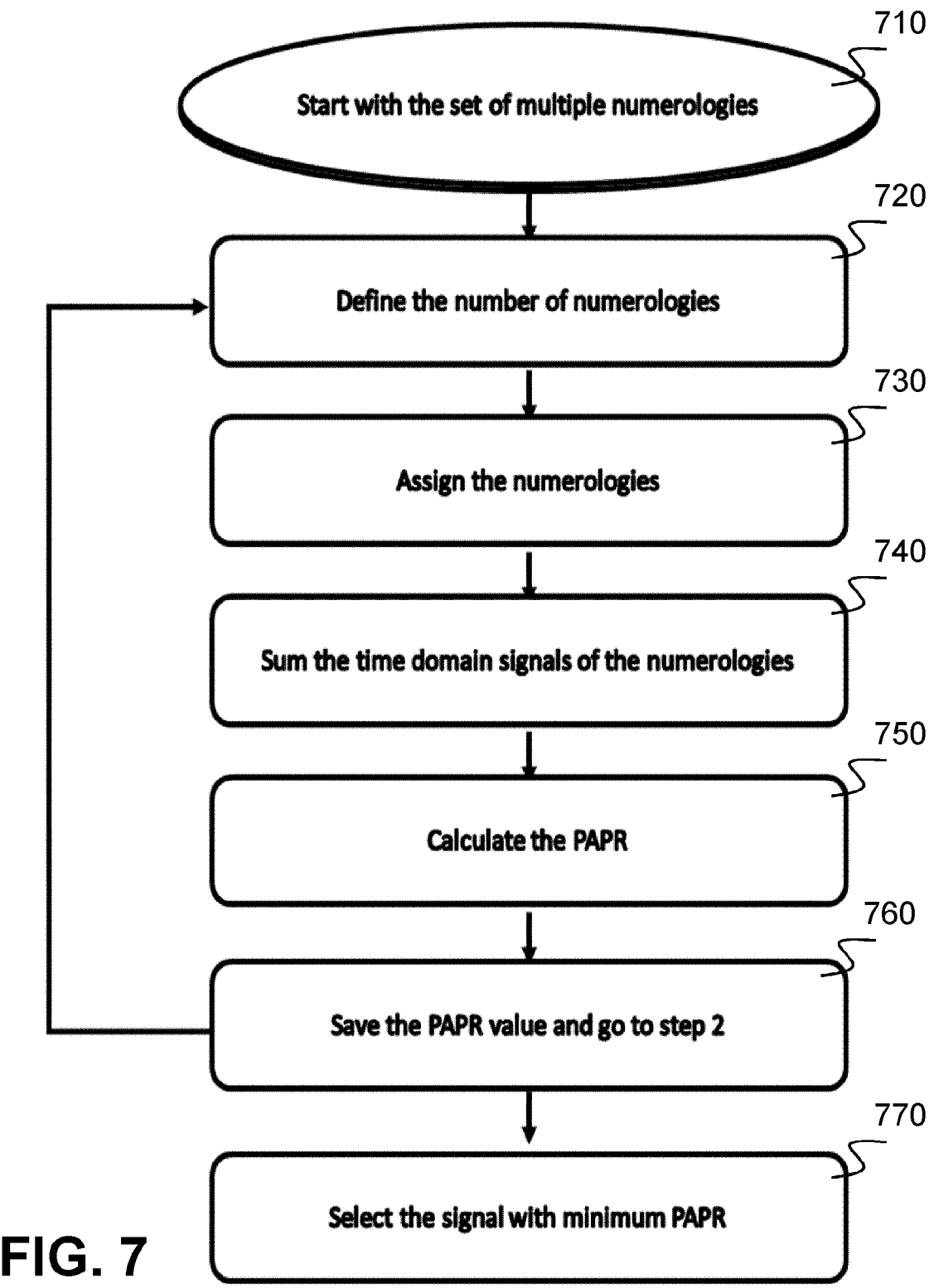
FIG. 7 is a flow chart showing steps of an exemplary method for reducing PAPR for multiple numerologies by provision of numerology parameters.

FIG. 7 shows a flow chart of an exemplary method, in which the PAPR reduction is based on selection of the number and type of numerologies. The method starts 710 with a set of predefined numerologies, i.e. numerologies that are configurable for the communication system or for the transmitting device. For example, the set of 5G-NR numerologies is defined for different SCS of 15, 30, 60, and 120 kHz. However, this set can be generated differently for various communication systems. In other words, the number of the configurable numerologies may be three or more (in general two or more). The numerologies in the set may differ by the SCS only or by a combination of SCS and other one or more parameters, such as CP length or the like.

After the numerology set is defined 710, the number of multiple numerologies that are to be used for the transmission may be determined 720. Then, based on the number of numerologies, the types of the numerologies (the numerologies to be combined for the transmission) are determined 730. For instance, let the numerology set consist of four numerologies. Then it is decided that two numerologies to be used for the transmission, and then the two numerologies are assigned as the 15 and 30 kHz numerologies. After the numerologies are generated, the signals of multiple numerologies are converted into time domain with IFFT operations (corresponding to processing of 430_1 and 430_2 for the receptive numerologies). Then, these signals are summed 740 to one signal x and the PAPR value of the summed signal is calculated 750. This PAPR value, as well as values calculated for other combinations of number of numerologies, type of numerologies and are saved 760 to decide 770 later the signal with minimum PAPR value.

In the example of FIG. 7, the same processing 720-760 is performed iteratively for all combinations of the numbers and types of multiple numerologies belonging to the set determined in 710. Finally, the signal with the minimum PAPR value among these combinations is selected in 770 based on the saved association between the PAPR and the corresponding number/type of numerology.

It is noted that the method of FIG. 7 is only exemplary. In general, number of numerologies does not have to be determined by optimization. For example, step 720 does not have to be performed as a part of the iterative processing. Instead, the number of numerologies to be used for the transmission may be determined beforehand for instance based on the capabilities, service requirements, resource utilization or the like. Then, the search for the optimum numerologies 730 (reducing PAPR) may be performed iteratively.

It is noted that in the above examples, the determination 720 and/or 730 of the number of numerologies and/or the type of numerologies for the transmission may be performed by minimizing a cost function including peak-to-average power ratio, PAPR, for a set of at least three numerologies. The term "based on minimizing" implies that it is not necessary to achieve the minimum solution. Rather, the determination is performed by means of a cost minimization procedure. This is applicable for any of the examples and embodiments described herein, e.g. also for the PAPR reduction based on adjustment processing determination.

For example, in order to decrease the computational complexity, a threshold PAPR value can be applied to terminate the iterations instead of processing all combinations. This may lead to a suboptimal result, but still reduce PAPR or at least result in PAPR with an acceptable value. For example, if the PAPR value of the signal is smaller than the threshold value in a particular iteration among the iterations described with reference to FIG. 7, the processes to find the signal with minimum PAPR value is stopped and the configuration resulting in the PAPR value which is smaller than the threshold is taken. This approach is also applicable to the adjustment processing determination or to any combination of numerology determination (number and/or type) and the adjustment processing(s) as described above. Also, similar alternatives or additional approaches for terminating iterations apply, as those described above with reference to adjustment processing determination.

In some embodiments the numerologies may be chosen from the numerology set for the PAPR reduction. Moreover, single numerology selection is possible in the proposed method. The cost function is not limited to PAPR and may include further costs such as INI.

In some embodiments, an apparatus may look in the same way as shown in FIG. 3A. The respective modules or program code parts may perform the steps of the PAPR reduction based on optimizing for the number and type of numerology and based on the above-described architecture for optimization of the adjustment processing(s).

Figure 11:
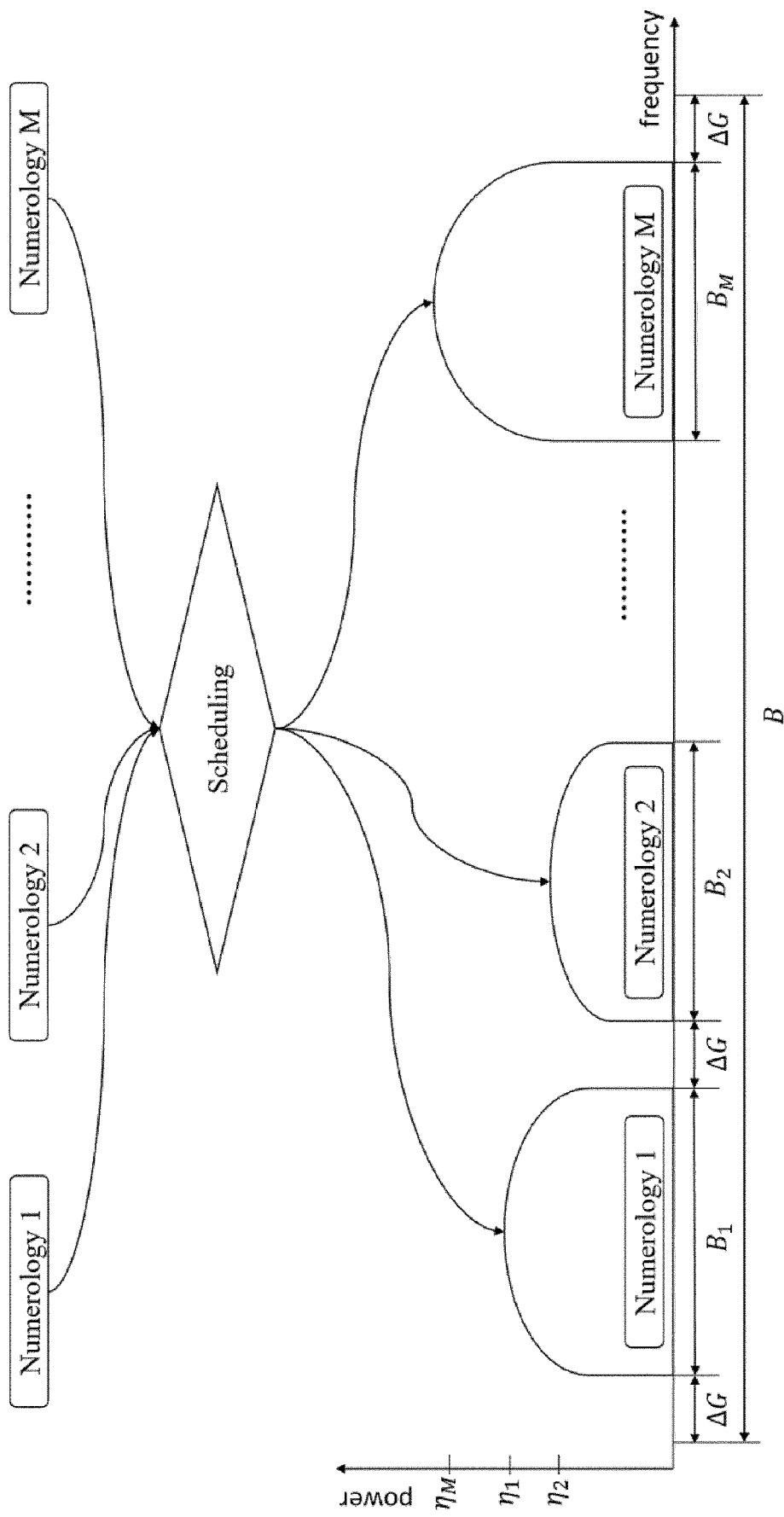
FIG. 11 is a schematic drawing illustrating numerology scheduling.

In order to address the long-standing PAPR problem of OFDM, the flexible numerology scheduling in multi-numerology systems may be further exploited for the PAPR reduction. Hence, a set of signals with different numerology scheduling may be generated to minimize the PAPR as illustrated in FIG. 11. In the multi-numerology scheduling method, in addition to the above-mentioned numerology selection, further parameters may be optimized. For example, three configuration parameters such as numerology, bandwidth, and power may be considered. Therefore, three sets of numerology, bandwidth, and power can be defined, including the respective possible configurations. Then, minimization of cost function including PAPR may be applied to determine the configuration to be applied. FIG. 11 shows possible bands $B_1 \ldots B_M$ in which selected numerologies 1-M (out of some pre-configured set of numerologies, in the FIG. numerologies 1-M) may be located, possible power value offsets applied to the respective numerologies. Some features of the present disclosure may (but does not have to) include:

A PAPR reduction technique for mixed numerology.

Technique for mixed numerology. This may be also PTS-based as will be described below.

No additional IFFT processing compare with conventional mixed numerology system while taking the advantage of new multi-numerology structure.

The computational complexity of optimization is substantially the same as the PTS technique.

Less computational complexity than some existing mixed-PAPR techniques.

Basically, the present disclosure shows utilizing the 5G-NR multi-numerology concept cleverly for the PAPR reduction purposes.

It is noted that the present disclosure is not limited to the cellular communication networks. Additionally, it can be applied and exploited at any platform which employs a mixed-numerology concept. One of the powerful candidates is the Wi-Fi Alliance, which is concerned with the local area networking. Wi-Fi has been using OFDM as a waveform and faces the same problems regarding PAPR. Therefore, mixed-numerology may be also implemented in the Wi-Fi access in future. One of possible advantages of the present disclosure is that it supports the existing communication standards without making any additional assumptions about the system.

PAPR Reduction Including Partial Transmit Sequence, PTS

As mentioned above, there is the partial transmit sequence (PTS) in OFDM. The PTS splits the input symbol into subblocks and transforms them with IFFT. Each subblock is multiplied by all combinations of the phase factors. After shifting the phases of the partitions, the optimum phases are obtained to minimize PAPR. One of the recent PTS techniques is explained in "*A Review of Partial Transmit Sequence for PAPR Reduction in the OFDM Systems*" (02.2019), by Y. A. Jawhar, L. Audah, M. A. Taher, K. N. Ramli, N. S. M. Shah, M. Musa and M. S. Ahmed. The PTS technique may be combined with the above described embodiments.

Figure 8:
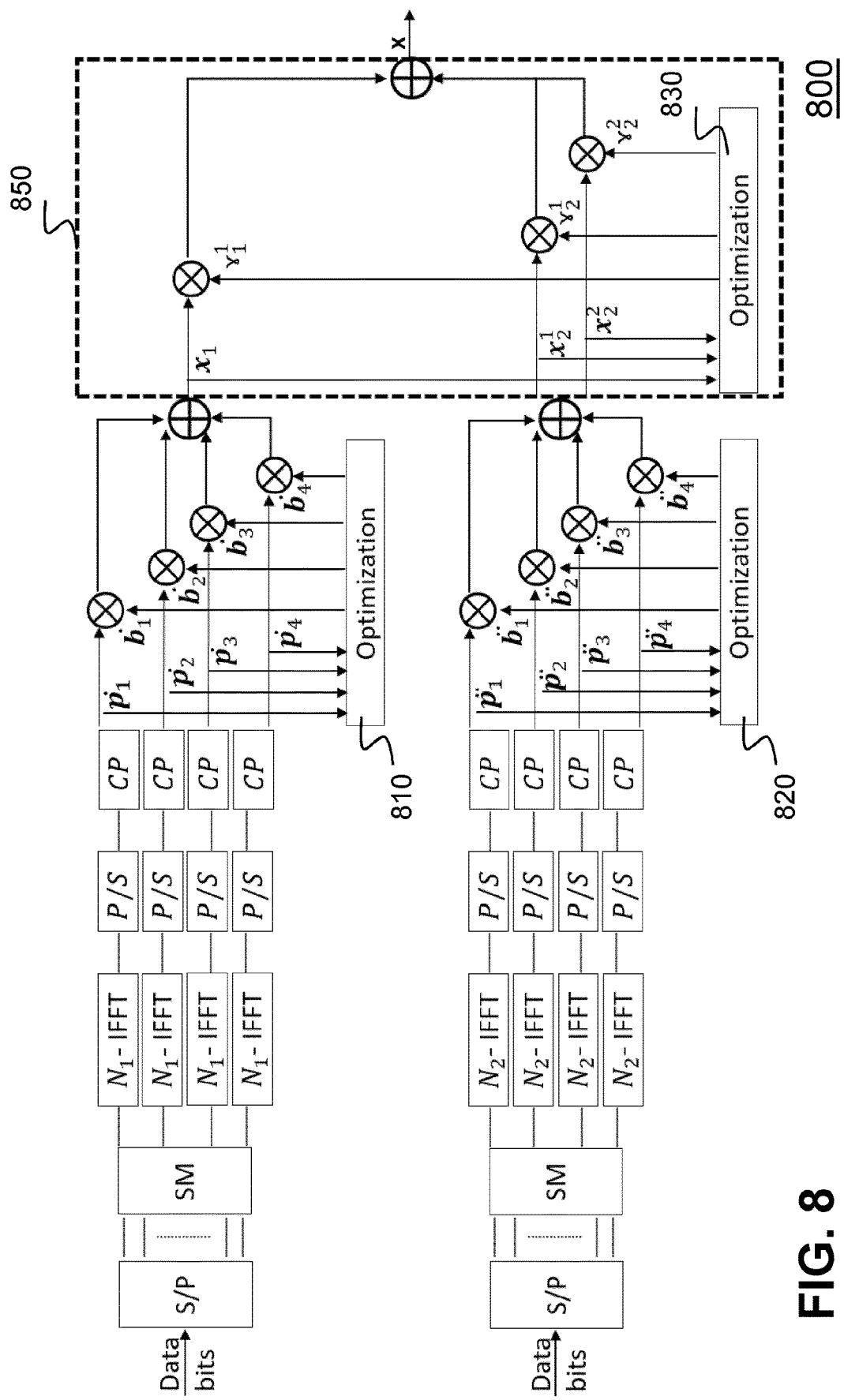
FIG. 8 is a block diagram illustrating a transmitting device applying a first exemplary hybrid PAPR reduction with PTS.
Figure 9:
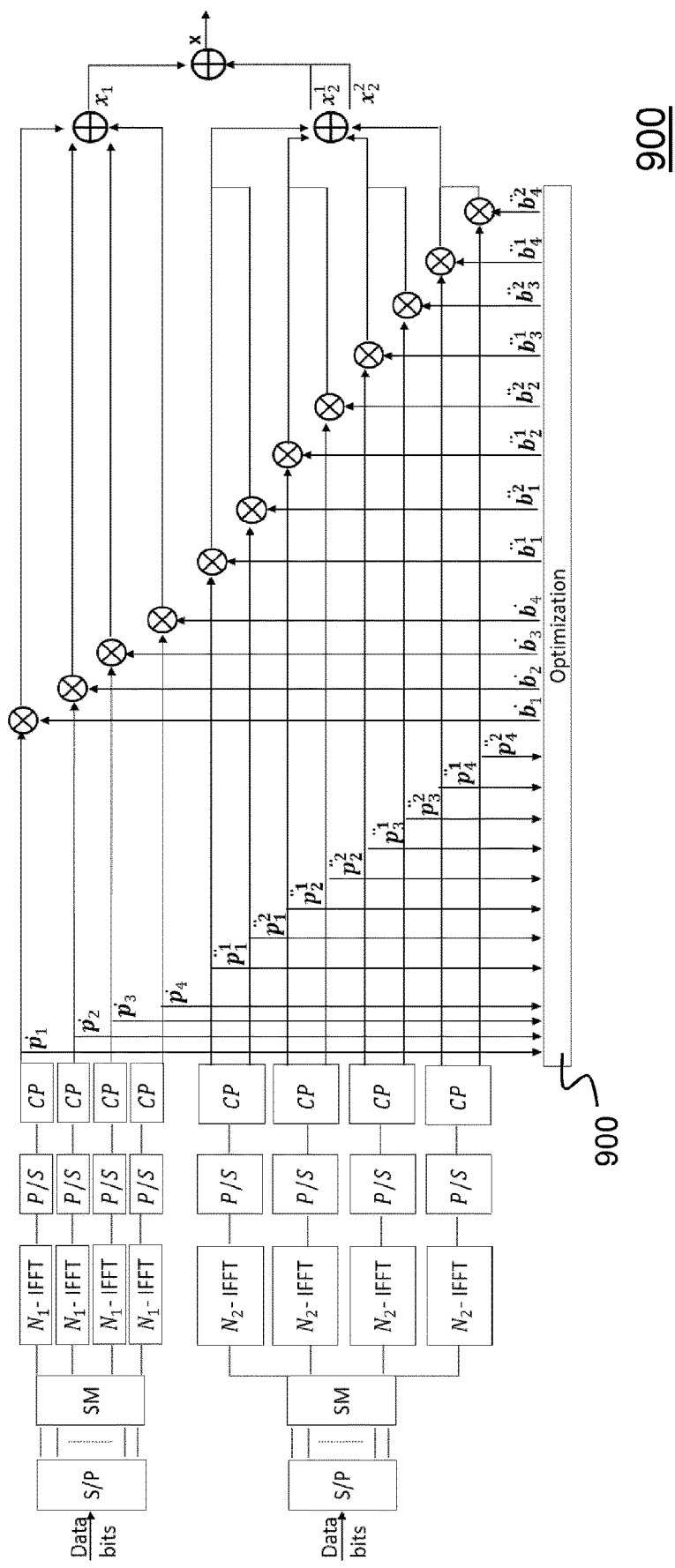
FIG. 9 is a block diagram illustrating a transmitting device applying a second exemplary hybrid PAPR reduction with PTS.

FIG. 8 illustrates such transmitting device 800. The data bits are inserted into the two branches representing the two different numerologies. After S/P conversions and modulation mapping (which are both optional so far), the PTS PAPR reduction technique divides the whole spectrum into subbands (V=4 in this example) and then takes the IFFT for each subband at the transmitter. After P/S conversion and adding CP to each of signals obtained by the IFFT of the respective subbands, in the time domain, these signals (corresponding to sub-symbols with a CP) are multiplied with a phase factor (in general adjustment processing which may be a phase adjustment processing and/or amplitude adjustment processing) separately to reduce (minimize) the PAPR. As shown in FIG. 8, the PTS optimization unit 810 is input the subsymbols $p_1'$, $p_2'$, $p_3'$, and $p_4'$ in the upper branch and selects the adjustment processing (here a phase factor) $b_1'$, $b_2'$, $b_3'$, and $b_4'$ corresponding to each respective subsymbol. The optimization may be performed testing some random values for a pre-configured number of iterations (or testing all possible combinations of values) for $b_1'$, $b_2'$, $b_3'$, and $b_4'$ and selecting the values which result in lowest PAPR.

Similarly, in optimization module 820, subsymbols $p_1''$, $p_2''$, $p_3''$, and $p_4''$ are input into the lower branch and the adjustment processing (here a phase factor) $b_1''$, $b_2''$, $b_3''$, and $b_4''$ are selected corresponding to each respective subsymbol. The optimization may be performed testing some random values for a pre-configured number of iterations (or testing all possible combinations of values) for $b_1''$, $b_2''$, $b_3''$, and $b_4''$ and selecting the values which result in lowest PAPR.

In these upper and lower branches, the optimization may involve other parameters (such as amplitude adjustment processing) and the cost function may also involve further cost contributions (e.g. INI). In the example of FIG. 8, the number of subblocks (subbands) is four for both the upper branch and the lower branch. However, this is only an example, and in other examples, the number of subbands may differ among the branches. As mentioned above, there may be more than two branches corresponding to more than two numerologies mixed.

The optimizations 810 and 820 belong to a PTS part of the PAPR reduction. The transmitter may also provide to the receiver side information for the phase adjustments $b_1'$, $b_2$, $b_3'$, and $b_4'$ as well as $b_1''$, $b_2''$, $b_3''$, and $b_4''$. The adjustments $b_1''$, $b_2''$, $b_3''$, and $b_4''$ may be provided separately for each of the two symbols $x_2^1$ and $x_2^2$. At a receiver, the side information for phases is used to decode (reconstruct) the symbols. The result of the upper branch is one signal corresponding to $x_1$. The result of the lower branch is two signals $x_2^1$ and $x_2^2$. These signals are obtained by combining (here concatenating) the subsymbol signals weighted by the respective phase adjustment factors. Then the result of concatenation is combined (here added) to the adjusted (weighted) symbol $x_1$ of the first numerology. Although PTS is an effective PAPR reduction method, it may increase computational complexity because of the multiple IFFT operations.

Following the PTS based adjustment parameter selection, module 850 corresponds to the PAPR reduction described in the above embodiments and examples (e.g. with reference to FIG. 3A, 3B, or 5). For example the optimization module 830 determines the adjustment processings (in this example the phase adjustment processing by respective phase adjustment values) $\gamma_1^1$, $\gamma_2^1$, $\gamma_2^2$ for the respective symbols $x_1$, $x_2^1$ and $x_2^2$. Then the adjustment values are used to modify the symbols $x_1$, $x_2^1$ and $x_2^2$—in this example by multiplying the symbols with these adjustment values being phase factors. It is noted that shifting (offsetting) the phase of a symbol (symbol sample) by $\alpha$ corresponds to multiplication of the symbol with a phase factor such as $\exp(j\alpha)$. The modified symbols $x_2^1$ and $x_2^2$ are concatenated and added to the modified symbol $x_1$.

The exemplary implementation shown in FIG. 8 is not the only way of combining PTS with the above-embodiments to reduce the PAPR. There may be further possibilities. Another example of transmitting device 900 is shown in FIG. 9. In FIG. 9, a single (possibly joint) optimization 900 is performed.

For example, the input data bits are handled similarly as in the foregoing examples. The input data bits are provided to each numerology, in this example two numerologies corresponding to the two—upper and lower branches. The two branches may also be referred to as top and bottom, or first and second branches. In each branch, the data bits are parallelized (S/P) and mapped to a modulation symbols (SM) of a predetermined modulation. The modulation symbols are (virtually) considered to define the discrete spectrum (band), or, in other words being mapped on subcarriers of a time-frequency resource grid. These modulation symbols are then divided into subbands, i.e. grouped to a plurality of modulation symbol groups (in this example four). Each of groups (subbands) is transformed separately to the time domain with a (discrete) IFFT (in general, any inverse transformation, as mentioned above), serialized (P/S) and added a CP. Then, a joint optimization of the adjustment values $b_1^{1''}$, $b_2^{1''}$, $b_3^{1''}$, and $b_4^{1''}$; $b_1^{2''}$, $b_2^{2''}$, $b_3^{2''}$, and $b_4^{2''}$ as well as $b_1'$, $b_2$, $b_3'$, and $b_4'$ may be performed to obtain a combination of these adjustment values leading to a reduced PAPR. The optimization may be performed by selecting the best combination among K combinations. The K combinations may be all possible combinations. However, the K may also be some pre-configured number larger than two, and the combinations may be generated randomly from among all possible combinations. The adjustments may be signaled as side information. However, as mentioned above, in the case of phase and amplitude adjustment, the signaling may be avoided because the receiver may compensate for the adjustment by channel estimation and equalization processing. On the other hand, if the adjustment processing includes other adjustments such as cyclic shift, time shift or the like, side information may be appropriate in order to appropriately detect the received signal.

For example, some embodiments concerning combination with PTS are not limited to the adjustment of phase/amplitude. Rather, time shifting/cyclic shifting may be optimized in addition or alternatively to the phase/amplitude adjustment processing. For example, cyclical shifting of each subblock sequence in the time domain may be performed for finding the optimum sequence to reduce PAPR. In other words, an optimized cyclic shift may be determined for each subblock in the time domain. This operation (adjustment processing) does not use any multiplication operations unlike the phase and amplitude adjustment. Thus, it may be less computationally complex.

In summary, the transmitting device in some embodiments has the processing circuitry which is configured to, for one or more numerologies among the at least two combined numerologies (for instance to one or more or all numerologies which are to be combined):
- to obtain modulation symbols corresponding to data to be transmitted (e.g. by mapping the input data bits onto the modulation symbols).
- to demultiplex the modulation symbols into two or more groups of modulation symbols (e.g. by alternately assigning the modulation symbols to the two or more groups or by alternately assigning chunks of modulation symbols to the two or more groups or the like);
- for each of the two or more groups to:
  - generate a subsymbol by inverse transforming said group,
  - determine a modification value or, in general adjustment processing, based on minimizing a cost function including PAPR (e.g. determine a phase and/or amplitude adjustment, select time shift, cyclic shift, or the like), and
  - applying the modification value to the subsymbol (e.g. by shifting the phase or modify the amplitude, or the like),
- to combine the subsymbols into a symbol of the one numerology (e.g. by addition and/or concatenation).

Exemplary and Non-Limiting Receiver Operation

The above-mentioned embodiments and examples can be applied and exploited in any platform which has a mixed-numerology concept exist. Besides, the disclosed subject matter fully supports the existing communication standards without making any additional assumptions about the systems.

Figure 10:
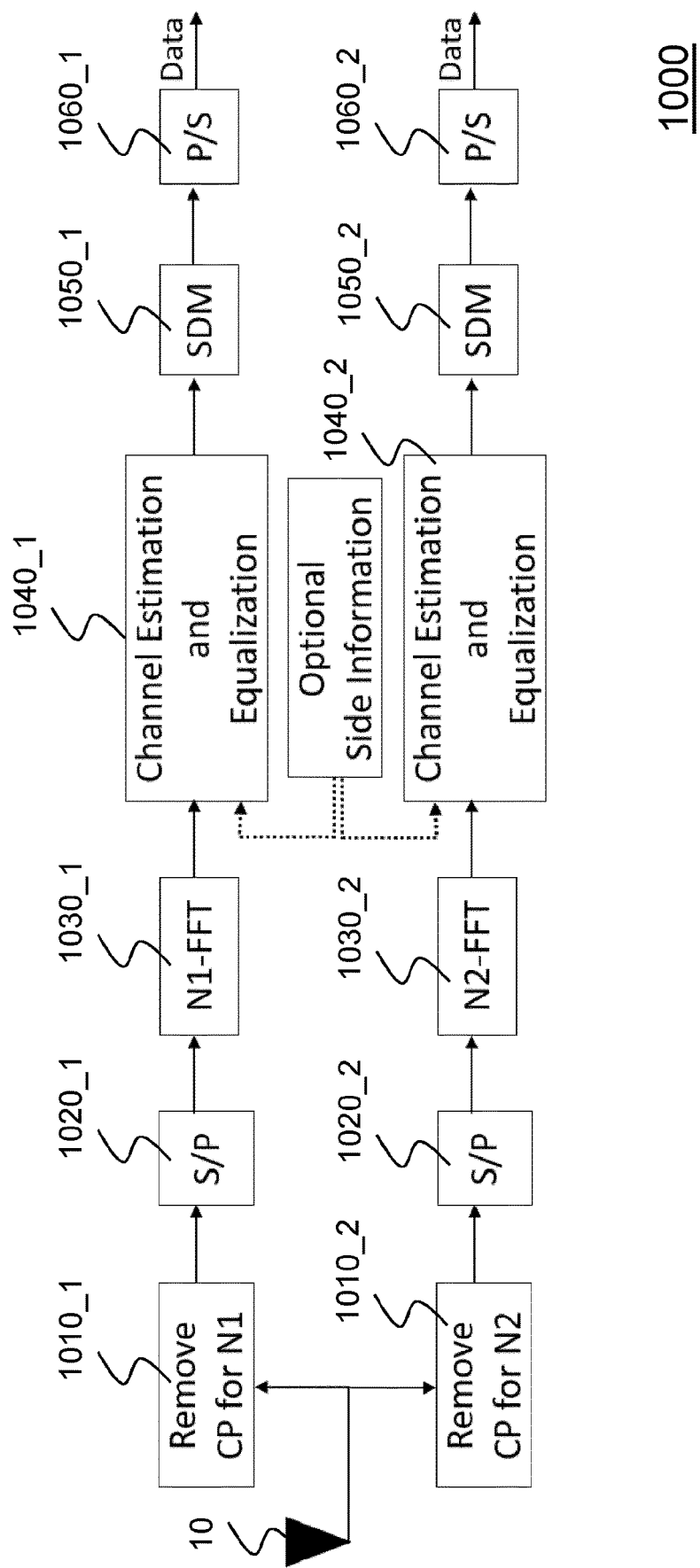
FIG. 10 is a block diagram illustrating a receiving device for reception of signals generated and transmitted by the transmitting devices of some embodiments.

For example, FIG. 10 shows an exemplary receiver which may receive the signal transmitted by the above described transmitters and provide the data bits as an output. As mentioned above, the transmitter may operate without additional signaling to the receiver, so that the receiver devices may remain unchanged in some embodiments.

However, the present disclosure is not limited thereto. In order to provide more flexibility, the transmitter may provide to the receiver some signaling regarding the PAPR reduction. For example, the transmitter may signal to the receiver some supporting parameters such as the modification/adjustment values or in general some parameters of another adjustment processing, especially for the PTS including embodiments. Moreover, the number and type of numerologies are typically signaled from the transmitter to the receiver.

The receiver 1000 of FIG. 10 comprises receiver front with at least one antenna 10 for receiving the time domain signal. The receiver front (not shown in detail) samples the received signal. The samples of the signal are then separated to the two or more numerologies (in the example of FIG. 10 two numerologies corresponding to N1 and N2 branches). The separation is possible e.g. due to the time alignment, SCS selection and the substantial orthogonality of the numerologies, as is clear to a skilled person and known from the art. The signal for each numerology is then processed separately (here in the first, upper branch and the second, lower branch). The CP is removed from the signal of the first numerology N1 in the CP removal module 1010_1 and from the signal of the second numerology N2 in the CP removal module 1010_2. The signal is parallelized in S/P modules 1020_1 and 1020_2. Then, the (forward rather than inverse) Fourier transformation (FFT) is performed in transformation modules 1030_1 and 1030_2—in correspondence to the inverse transformation applied at the transmitter (e.g. 430_1 and 430_2).

In channel estimation and equalization modules 1040_1 and 1040_2, the channel estimation may be performed to detect frequency and phase shift. Any of the existing approaches may be used. In this way, the phase and/or amplitude adjustment performed at the transmitter may be detected without additional signaling. On the other hand, side information may be appropriate for adjustment processing concerning the selection of the cyclic shift, or other parameters. Correspondingly, the detected frequency and/or phase shift may be corrected (equalization) may be performed. The channel estimation and equalization may also include determination of the channel characteristics (channel matrix) relating to the amplitude of the signal and equalizing accordingly. As can be seen in FIG. 10, the channel estimation and equalization may be input a side information such as in case of the PTS part the modification/adjustment processings (e.g. phase adjustment processing). The equalized time domain samples corresponding to modulation symbols are then demapped in demapping modules SDM 1050_1 and 1050_2 and serialized in modules P/S 1060_1 and 1060_2 respectively.

In some embodiments, the numerology selection is also signaled, e.g., the number of numerologies (which then determined the number of branches to process the input signal) and/or the numerologies selected.

Implementations in Software and Hardware

The methodologies described herein (at the transmitter side and the received side) may be implemented by various means depending upon the application. For example, these methodologies may be implemented in hardware, operation system, firmware, software, or any combination of two or all of them. For a hardware implementation, any processing circuitry may be used, which may include one or more processors. For example, the hardware may include one or more of application specific integrated circuits (ASICs), digital signal processors (DSPs), digital signal processing devices (DSPDs), programmable logic devices (PLDs), field programmable gate arrays (FPGAs), processors, controllers, any electronic devices, or other electronic circuitry units or elements designed to perform the functions described above.

If implemented as program code, the functions performed by the transmitting apparatus (device) may be stored as one or more instructions or code on a non-transitory computer readable storage medium such as the memory 310 or any other type of storage. The computer-readable media includes physical computer storage media, which may be any available medium that can be accessed by the computer, or, in general by the processing circuitry 320. Such computer-readable media may comprise RAM, ROM, EEPROM, optical disk storage, magnetic disk storage, semiconductor storage, or other storage devices. Some particular and non-limiting examples include compact disc (CD), CD-ROM, laser disc, optical disc, digital versatile disc (DVD), Blu-ray (BD) disc or the like. Combinations of different storage media are also possible—in other words, distributed and heterogeneous storage may be employed.

The embodiments and exemplary implementations mentioned above show some non-limiting examples. It is understood that various modifications may be made without departing from the claimed subject matter. For example, modifications may be made to adapt the examples to new systems and scenarios without departing from the central concept described herein.

Selected Embodiments and Examples

Summarizing, methods and techniques are described for reducing PAPR in a system with multiple numerologies. The PAPR is reduced by means of minimization of a cost function including PAPR for some predefined parameters. For example, PAPR may be minimized for phase and/or amplitude adjustment to adjust OFDM symbol phase and/or amplitude, or for number and/or type of numerologies to be combined for the transmission and/or other transmission parameters that may have an impact on PAPR such as time shift, cyclic shift, or the like.

A transmitting device is provided, the transmitting device comprising: processing circuitry (320) configured to: generate a plurality of Orthogonal Frequency Division Multiplex, OFDM, symbols of at least two numerologies; determine an adjustment processing for each of the plurality of OFDM symbols based on minimizing a cost function including peak-to-average power ratio, PAPR, for a combination of the at least two numerologies; apply, to each of the plurality of OFDM symbols, the adjustment processing determined therefor to provide adjusted OFDM symbols, and combine the adjusted OFDM symbols of the at least two numerologies; and a transceiver (310) configured to transmit a signal carrying the adjusted OFDM symbols of the at least two numerologies as combined.

For example, the adjustment processing is at least one of: a phase adjustment, an amplitude adjustment, time shifting, cyclic shifting, filtering parameters, and windowing.

For example, the processing circuitry (320) is configured to select a number of the numerologies to be combined and/or the at least two numerologies among a predefined set of numerologies based on the PAPR of the symbols generated by the combination.

For example, the selection of the number of numerologies to be combined and/or the at least two numerologies to be combined is performed by minimizing the cost function including the number of numerologies to be combined and/or the at least two numerologies.

In some embodiments, the cost function further includes inter-numerology interference.

In some embodiments, the processing circuitry is configured to perform the determining of the adjustment processing iteratively, by determining the cost function for adjustment processings out of a predefined set of adjustment processings, and by selecting, from the predefined set of adjustment processings, the adjustment processing for which the lowest cost function was achieved.

In some embodiments, the processing circuitry is configured to, for at least one numerology of the at least two numerologies: obtain modulation symbols corresponding to data to be transmitted; demultiplex the modulation symbols into two or more groups of modulation symbols; for each of the two or more groups: generate a subsymbol by inverse transforming the group, determine an adjustment processing based on minimizing the cost function including PAPR, and applying the adjustment processing to the subsymbol, concatenate the subsymbols into a symbol of the at least one numerology.

A transmitting device is providing comprising: processing circuitry configured to determine at least two numerologies out of a predefined set of numerologies based on minimizing a cost function including peak-to-average power ratio, PAPR, for combinations of numerologies out of the predefined set of numerologies; generate a plurality of Orthogonal Frequency Division Multiplex, OFDM, symbols of the at least two numerologies; and combine the plurality of OFDM symbols of the at least two numerologies; and a transceiver configured to transmit a signal carrying OFDM symbols of the at least two numerologies as combined.

For example, the determining of the at least two numerologies includes at least one of (i) determining a number of numerologies, and (ii) determining a subcarrier spacing for at least one numerology.

For example, the processing circuitry is configured to: iteratively perform the minimizing of the cost function, each iteration including: obtaining a number of numerologies and the subcarrier spacing of each of the number of numerologies; and determining PAPR for the signal generated with a combination of these numerologies; and select the two or more numerologies which lead to the lowest PAPR among the iterations.

In some embodiments, the iterations are stopped when the cost function is lower than a stopping threshold and/or when the number of iterations reaches a pre-configured value.

In some embodiments, the processing circuitry is configured to generate the plurality of OFDM symbols by: obtaining first input data to be mapped onto the first numerology and second input data to be mapped onto the second numerology; mapping the first input data onto first modulation symbols and the second input data onto second modulation symbols; inverse transforming the first modulation symbols and the second modulation symbols into a first OFDM symbol and a second OFDM symbol; and add a cyclic prefix to each OFDM symbol among the first OFDM symbol and the second OFDM symbol, wherein the length of the cyclic prefix added to the first OFDM symbol differs from the length of the cyclic prefix added to the second OFDM symbol.

In some embodiments, the first numerology and the second numerology mutually differ by subcarrier spacing and/or by length of the OFDM symbols.

A method is provided for transmitting a signal, comprising: generating a plurality of Orthogonal Frequency Division Multiplex, OFDM, symbols of at least two numerologies; determining (630) an adjustment processing for each of the plurality of OFDM symbols based on minimizing a cost function including peak-to-average power ratio, PAPR, for a combination of the at least two numerologies; applying (640), to each of the plurality of OFDM symbols, the adjustment processing determined therefor (i.e. the corresponding determined adjustment processing); combining (650) the first numerology and the second numerology; and transmitting a signal carrying the first numerology and second numerology as combined.

For example, the adjustment processing is at least one of: a phase adjustment, an amplitude adjustment, time shifting, cyclic shifting, filtering parameters, and windowing.

For example, the method includes selecting a number of the numerologies to be combined and/or the at least two numerologies among a predefined set of numerologies based on the PAPR of the symbols generated by the combination.

For example, the selection of the number of numerologies to be combined and/or the at least two numerologies to be combined is performed by minimizing the cost function including the number of numerologies to be combined and/or the at least two numerologies.

In some embodiments, the cost function further includes inter-numerology interference.

In some embodiments, the method includes performing the determining of the adjustment processing iteratively, by determining the cost function for adjustment processings out of a predefined set of adjustment processings, and by selecting, from the predefined set of adjustment processings, the adjustment processing for which the lowest cost function was achieved.

In some embodiments, the method includes, for at least one numerology of the at least two numerologies: obtaining modulation symbols corresponding to data to be transmitted; demultiplexing the modulation symbols into two or more groups of modulation symbols; for each of the two or more groups: generating a subsymbol by inverse transforming the group, determining an adjustment processing based on minimizing the cost function including PAPR, and applying the adjustment processing to the subsymbol, and concatenating the subsymbols into a symbol of the at least one numerology.

A method is provided for transmitting a signal, comprising: determining at least two numerologies out of a predefined set of numerologies based on minimizing a cost function including peak-to-average power ratio, PAPR, for combinations of numerologies out of the predefined set of numerologies; generating a plurality of Orthogonal Frequency Division Multiplex, OFDM, symbols of the at least two numerologies; combining the plurality of OFDM symbols of the at least two numerologies; transmitting a signal carrying the plurality of OFDM symbols of the at least two numerologies as combined.

For example, the determining of the at least two numerologies includes at least one of (i) determining a number of numerologies, and (ii) determining a subcarrier spacing for at least one numerology.

For example, the method includes: iteratively performing the minimizing of the cost function, each iteration including: obtaining a number of numerologies and the subcarrier spacing of each of the number of numerologies; and determining PAPR for the signal generated with a combination of these numerologies; and select the two or more numerologies which lead to the lowest PAPR among the iterations.

In some embodiments, the iterations are stopped when the cost function is lower than a stopping threshold and/or when the number of iterations reaches a pre-configured value.

In some embodiments, the method includes generating the plurality of OFDM symbols by: obtaining first input data to be mapped onto the first numerology and second input data to be mapped onto the second numerology; mapping the first input data onto first modulation symbols and the second input data onto second modulation symbols; inverse transforming the first modulation symbols and the second modulation symbols into a first OFDM symbol and a second OFDM symbol; and adding a cyclic prefix to each OFDM symbol among the first OFDM symbol and the second OFDM symbol, wherein the length of the cyclic prefix added to the first OFDM symbol differs from the length of the cyclic prefix added to the second OFDM symbol.

In some embodiments, the first numerology and the second numerology mutually differ by subcarrier spacing and/or by length of the OFDM symbols.

Moreover, the corresponding methods are provided including steps performed by any of the above mentioned processing circuitry implementations.

Still further, a computer program is provided, stored on a non-transitory medium, and comprising code instructions which when executed by a computer or by a processing circuitry, performs steps of any of the above-mentioned methods.

According to some embodiments, the processing circuitry and/or the transceiver is embedded in an integrated circuit, IC.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

The invention claimed is:

1. A transmitting device comprising:
   processing circuitry configured to:
   generate a plurality of Orthogonal Frequency Division Multiplex (OFDM) symbols of at least two numerologies;
   determine an adjustment processing for each of the plurality of OFDM symbols based on minimizing a cost function including peak-to-average power ratio (PAPR) for a combination of the at least two numerologies;
   apply, to each of the plurality of OFDM symbols, the adjustment processing determined therefor to provide adjusted OFDM symbols, and
   combine the adjusted OFDM symbols of the at least two numerologies; and
   a transceiver configured to transmit a signal carrying the adjusted OFDM symbols of the at least two numerologies as combined.

2. The transmitting device according to claim 1, wherein the adjustment processing is at least one of:
   a phase adjustment,
   an amplitude adjustment,
   time shifting,
   cyclic shifting,
   filtering parameters, and/or
   windowing.

3. The transmitting device according to claim 1, wherein the processing circuitry is configured to select a number of the numerologies to be combined and/or the at least two numerologies among a predefined set of numerologies based on the PAPR of the symbols generated by the combination.

4. The transmitting device according to claim 3, wherein the selection of the number of numerologies to be combined and/or the at least two numerologies to be combined is performed by minimizing the cost function including the number of numerologies to be combined and/or the at least two numerologies.

5. The transmitting device according to claim 1, wherein the cost function further comprises inter-numerology interference.

6. The transmitting device according to claim 1, wherein the processing circuitry is configured to perform the determining of the adjustment processing iteratively, by determining the cost function for adjustment processings out of a predefined set of adjustment processings, and by selecting, from the predefined set of adjustment processings, the adjustment processing for which the lowest cost function was achieved.

7. The transmitting device according to claim 1, wherein the processing circuitry is configured to, for at least one numerology of the at least two numerologies:
   obtain modulation symbols corresponding to data to be transmitted;
   demultiplex the modulation symbols into two or more groups of modulation symbols;
   for each of the two or more groups:
   generate a subsymbol by inverse transforming the group,
   determine an adjustment processing based on minimizing the cost function including PAPR, and apply the adjustment processing to the subsymbol, and concatenate the subsymbols into a symbol of the at least one numerology.

8. A transmitting device comprising:
processing circuitry configured to:
determine at least two numerologies out of a predefined set of numerologies based on minimizing a cost function including peak-to-average power ratio (PAPR) for combinations of numerologies out of the predefined set of numerologies;
generate a plurality of Orthogonal Frequency Division Multiplex (OFDM) symbols of the at least two numerologies; and
combine the plurality of OFDM symbols of the at least two numerologies; and
a transceiver configured to transmit a signal carrying OFDM symbols of the at least two numerologies as combined.

9. The transmitting device according to claim 8, wherein the determining of the at least two numerologies comprises at least one of (i) determining a number of numerologies, and/or (ii) determining a subcarrier spacing for at least one numerology.

10. The transmitting device according to claim 8, wherein the processing circuitry is configured to:
iteratively perform the minimizing of the cost function, each iteration comprising:
obtaining a number of numerologies and the subcarrier spacing of each of the number of numerologies; and
determining PAPR for the signal generated with a combination of these numerologies; and
select the two or more numerologies which lead to the lowest PAPR among the iterations.

11. The transmitting device according to claim 10, wherein the iterations are stopped when the cost function is lower than a stopping threshold and/or when the number of iterations reaches a pre-configured value.

12. The transmitting device according to claim 8, wherein the processing circuitry is configured to generate the plurality of OFDM symbols by:
obtaining first input data to be mapped onto the first numerology and second input data to be mapped onto the second numerology;
mapping the first input data onto first modulation symbols and the second input data onto second modulation symbols;
inverse transforming the first modulation symbols and the second modulation symbols into a first OFDM symbol and a second OFDM symbols; and
add a cyclic prefix to each OFDM symbol among the first OFDM symbol and the second OFDM symbol, wherein the length of the cyclic prefix added to the first OFDM symbol differs from the length of the cyclic prefix added to the second OFDM symbol.

13. The transmitting device according to claim 8, wherein the first numerology and the second numerology mutually differ by subcarrier spacing and/or by length of the OFDM symbols.

14. A method for transmitting a signal, comprising:
generating a plurality of Orthogonal Frequency Division Multiplex (OFDM) symbols of at least two numerologies;
determining an adjustment processing for each of the plurality of OFDM symbols based on minimizing a cost function including peak-to-average power ratio (PAPR) for a combination of the at least two numerologies;
applying, to each of the plurality of OFDM symbols, the adjustment processing determined therefor;
combining the first numerology and the second numerology; and
transmitting a signal carrying the first numerology and second numerology as combined.

15. A method for transmitting a signal, comprising:
determining at least two numerologies out of a predefined set of numerologies based on minimizing a cost function including peak-to-average power ratio (PAPR) for combinations of numerologies out of the predefined set of numerologies;
generating a plurality of Orthogonal Frequency Division Multiplex (OFDM) symbols of the at least two numerologies;
combining the plurality of OFDM symbols of the at least two numerologies;
transmitting a signal carrying the plurality of OFDM symbols of the at least two numerologies as combined.

16. The transmitting device according to claim 6, wherein the iterations are stopped when the cost function is lower than a stopping threshold and/or when the number of iterations reaches a pre-configured value.

17. The transmitting device according to claim 1, wherein the processing circuitry is configured to generate the plurality of OFDM symbols by:
obtaining first input data to be mapped onto the first numerology and second input data to be mapped onto the second numerology;
mapping the first input data onto first modulation symbols and the second input data onto second modulation symbols;
inverse transforming the first modulation symbols and the second modulation symbols into a first OFDM symbol and a second OFDM symbols; and
add a cyclic prefix to each OFDM symbol among the first OFDM symbol and the second OFDM symbol, wherein the length of the cyclic prefix added to the first OFDM symbol differs from the length of the cyclic prefix added to the second OFDM symbol.

18. The transmitting device according to claim 1, wherein the first numerology and the second numerology mutually differ by subcarrier spacing and/or by length of the OFDM symbols.

* * * * *